Dec. 6, 1949     R. E. SNYDER     2,490,659
SOLAR HEATED VACUUM STILL

Filed April 24, 1944     3 Sheets-Sheet 1

INVENTOR.
ROBERT E. SNYDER,
BY
Robert W. Fulwider
ATTORNEY.

Dec. 6, 1949  R. E. SNYDER  2,490,659
SOLAR HEATED VACUUM STILL
Filed April 24, 1944  3 Sheets-Sheet 2

INVENTOR.
ROBERT E. SNYDER,
BY
*Robert N. Fulwider*
ATTORNEY.

Dec. 6, 1949

R. E. SNYDER 2,490,659

SOLAR HEATED VACUUM STILL

Filed April 24, 1944

INVENTOR.
ROBERT E. SNYDER,
BY
Robert M. Fulwider
ATTORNEY.

Patented Dec. 6, 1949

2,490,659

UNITED STATES PATENT OFFICE 2,490,659

SOLAR HEATED VACUUM STILL

Robert E. Snyder, Los Angeles, Calif.

Application April 24, 1944, Serial No. 532,386

7 Claims. (Cl. 202—205)

This invention relates to a method and means for distilling water in a vacuum using solar heat as the energy source. One of the objects of the invention is to provide for continuous operation of the unit whenever solar heat is available. Another object of the invention is to provide a simple and convenient means for periodically removing the heavy end products from the still during its operation. Another object of the invention is to provide means for redistilling the distillate, and means for chemically sterilizing the first distillate before it is redistilled. Still another object of my invention is to provide a continuous redistillation process, the energy for which process is derived from solar heat. A further object of my invention is to provide means for controlling the quantity of liquid in both the boiler side and the distillate reservoir side of the unit. Another object of the invention is to provide a solar energy absorbing unit which will expose the maximum absorption surface to solar radiation. These and other objects and advantages of my invention will become apparent from the following description of preferred forms thereof, and from the accompanying drawings in which:

In any apparatus for distilling water, the fundamental requirement is that the distilling means shall be as efficient as possible, and that the greatest amount of liquid shall be distilled for the energy used. The largest and most inexpensive source of energy universally available over a large portion of the earth is solar energy. However, the concentration of sufficient solar energy to attain high temperatures is relatively difficult, and consequently large scale installations using large quantities of solar heat, but at relatively low temperatures are most efficient. The distillation of any liquid is most efficient if the gas pressure upon the surface of the liquid is a minimum, and the lowest possible gas pressure is attained in a vacuum wherein the only pressure on the surface of the liquid is that of the liquid vapor. Water in a barometric column has only the vapor pressure of the water at the given temperature upon its surface and the pressure is therefore at a minimum. Under these ideal conditions the boiling point of water is about 100° F. instead of 212° F. as it is under normal sea level air pressure. A solar absorber operating on a thermal cycle in which the maximum temperature is in the neighborhood of 100° F. is more efficient than a similar absorber operating on a temperature of approximately 212° F., and consequently I provide a still for water which operates on solar energy at the lowest possible boiling point of water.

Figure 1:
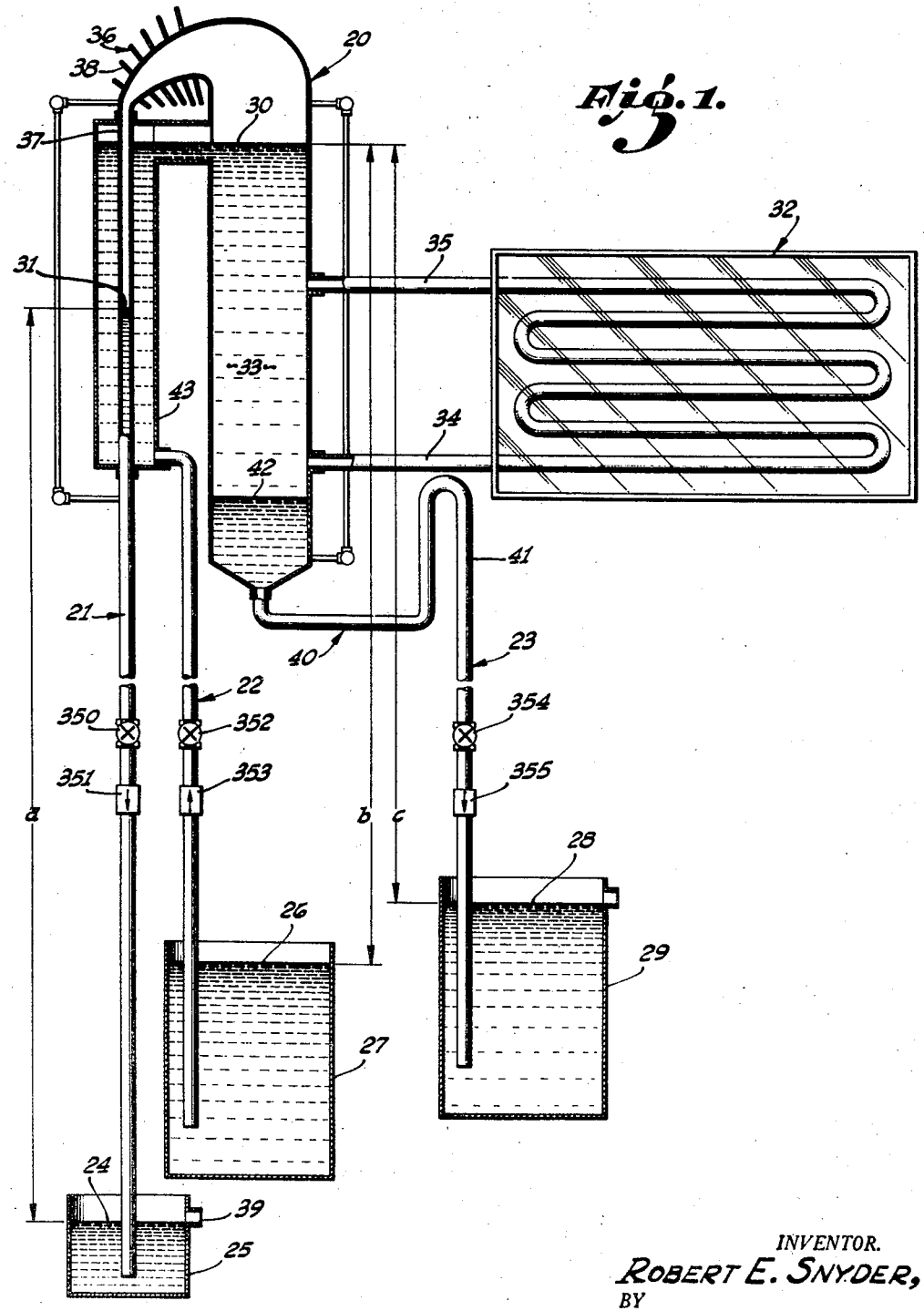
Fig. 1 is a diagrammatic view partly in section of a vacuum still located at the top of a barometric column.

Referring now to the drawings and particularly to Fig. 1 thereof, the numeral 20 indicates a boiler which is located at the head of barometric columns 21, 22 and 23. The lower end of barometric column 21 is immersed in fluid 24 located in a reservoir 25, the lower end of column 22 is immersed in fluid 26 located in a reservoir 27, and the lower end of column 23 is immersed in fluid 28 located in a reservoir 29. Fluid 33 in the boiler 20 is supported at the level 30 by air pressure on the surface of fluids 26 and 28 in their respective reservoirs 27 and 29 at the base of barometric columns 22 and 23, respectively. Fluid level 31 in barometric column 21 is supported by air pressure on the surface 24 of the fluid located in reservoir 25. Connected to boiler 20 is a solar heater element 32 which consists of a series of interconnected fluid passages through which the liquid 33 of boiler 20 may be circulated by thermal convection action. In general, the fluid leaves boiler 20 by a pipe 34, travels through the heater element 32, and re-enters boiler 20 through a pipe 35 located above pipe 34. The solar energy absorbed in heater unit 32 is transferred to the circulating fluid, and serves to raise it to a temperature at which it boils in reservoir 20. The vapor from boiler 20 travels upward into a condenser 36 where it condenses into liquid and runs by gravity down pipe 37 to join the fluid in barometric column 21. The heat absorbed in condenser 36 may be dissipated into the air by vanes 38.

The height $a$ of the fluid in a barometric column 21 is determined by the density of the fluid in that column, and inasmuch as this is pure water, its height will be the greatest of all of the barometric columns. Height $b$ of the fluid in barometric column 22 is determined by the density of the raw, undistilled water, and will be shorter than column $a$. Column $c$ which has in it some of the heavy salt ends left by the distilling process will be the shortest of all three.

As the liquid is evaporated from the boiler over into the condenser, the salts and other dissolved or precipitated material in the liquid will be left in boiler 20. The level of the liquid in boiler 20 will tend to fall, as vapor is boiled from its surface, and this will tend to shorten barometric column $b$. However, air pressure on the fluid surface 26 of reservoir 27 will force fluid therefrom up barometric column 22 to maintain barometric column $b$ constant. Thus, as fluid continually boils off surface 30 in the boiler, more fluid will constantly be forced up barometric column 22 and into the boiler 20 to replace the fluid lost by evaporation. In a similar manner, the distillate which is added to the top of barometric column 21 tends to raise the fluid level 31 in barometric column 21, or, in other words, tends to increase fluid column height $a$. However, this added fluid cannot be supported by the air pressure on surface 24 of reservoir 25, and therefore, it flows out the bottom of barometric column 21 and the fluid height $a$ remains constant. Thus we have a constant movement of raw liquid into the still from reservoir 27, and continuous production of distilled vapor which is condensed into liquid and is added to barometric column 21. For most efficient and uninterrupted operation of the still, means (not shown) is provided to maintain the fluid level 26 in inlet 27 at a substantially constant height, and also an overflow outlet 39 is provided on the distillate reservoir 25 to maintain its level 24, and hence fluid column $a$ in barometric column 21 at a constant height.

It has been noted in the operation of the unit shown in Fig. 1 that there is considerable movement of the fluid back and forth through columns 21, 22 and 23. This bouncing of the fluid back and forth can be slowed down in any one of several ways. One of the simplest is to install check valves in the columns so that the fluid will move in but one direction through them. Column 21 is provided with check valve 351 which will permit fluid to move only downwardly in that column. Column 22 is provided with check valve 353 which will permit the fluid to move only upwardly in this column, and column 23 is provided with check valve 355 which will permit the fluid to move only downwardly in this column. As an added control, a shut-off valve is used in each column to vary the flow therethrough should it be necessary. Columns 21, 22, and 23 are provided with shut-off valves 350, 352 and 354, respectively. By regulation of the shut-off valves in conjunction with the check valves, a uniform flow of fluid through the system may be maintained, and the bouncing of the fluid can be entirely eliminated. Other types of control of this feature, such as orifices or labyrinths which will offer resistance to rapid movement of the fluid therethrough could be used if it were so desired.

During operation of the still, the continuous evaporation of water from the boiler causes an increase in the concentration of salts in the boiler liquid 33, which of course increases the density of the liquid. The heavier salt ends tend to settle into the bottom of boiler 20, and this tendency is further increased by the addition of inlet fluid of less density to the top of boiler 20. As the density of the fluid in boiler 20 increases, it builds up a pressure in the bottom of boiler 20, which I utilize for automatic cleaning of the boiler.

Barometric column 23 has a trap 40 connected to the bottom of the boiler and provided with a U-shaped section 41. As long as the density of the fluid in boiler 20 down through trap section 40 and 41 to reservoir 29 remains constant, there is no tendency for fluid to move in this column, but as the density of the fluid in boiler 20 increases, this heavy fluid settles into trap 40. If the level of this heavier fluid stays below the top of the U-shaped portion 41 of the trap, a balance is maintained, but when the heavy liquid in boiler 20 builds up above level 42, i. e., above the level of the U-shaped portion of the trap, a condition of unbalance results, causing a siphon action to take place whereby the heavy liquid siphons out of the trap down into reservoir 29. Once the siphon action starts, the liquid density in column 23 becomes very high, and the heavy ends continue to run out of the boiler into the reservoir 29. This fluid is replaced by raw fluid coming up barometric column 22 and into the top of the boiler. The action continues until substantially all of the heavy fluid has drained from the boiler and the densities of the fluids in barometric columns 22 and 23 are again the same. This action is periodic, and does not interfere with the continuous operation of the still, except that a certain portion of the heat is lost when the reservoir is emptied of warm water and filled again with cold water from the inlet side.

From a theoretical standpoint, the temperature of the liquid 33 in boiler 20 and of the condensate in pipe 37 is the same, the heat given up in the condenser 35 being only the heat of vaporization of the liquid. Therefore, for highest thermal economy, inlet water of barometric column 22 is passed through a preheater 43 in which the inlet water circulates around pipe 37 carrying the relatively warm distilled water. The temperature of the inlet water and the distillate thus come to a thermodynamic equilibrium between their original respective temperatures, which increases the general thermal efficiency of the unit.

Figure 2:
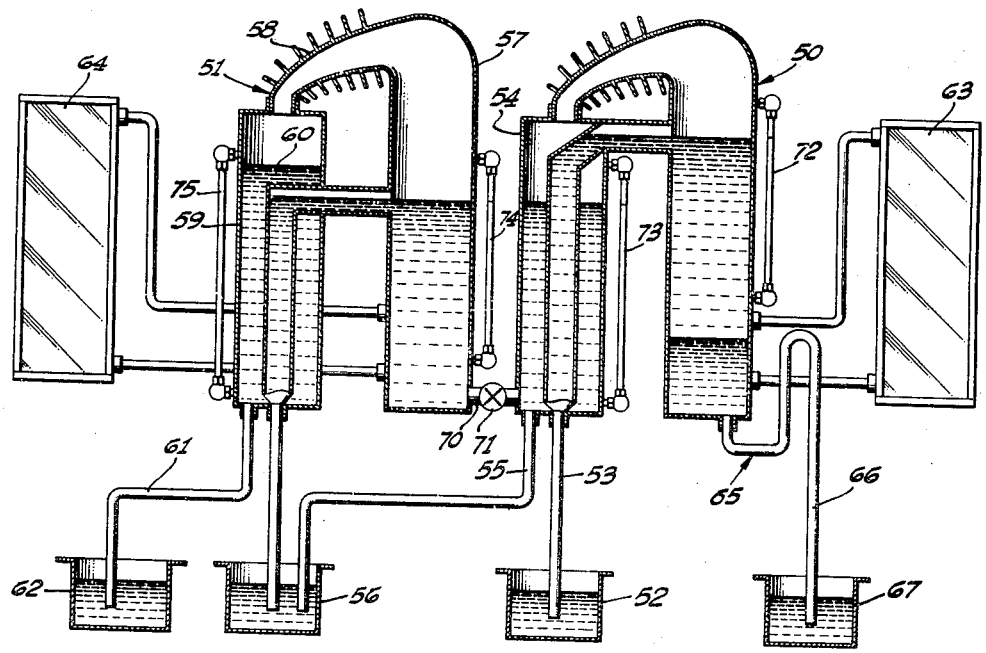
Fig. 2 is a diagrammatic layout of a continuous redistillation still.

Fig. 2 shows a double vacuum still comprised of two units, 50 and 51, each of which is the same in operating principle as that described in Fig. 1. However, units 50 and 51 are linked together so that the distillate from unit 50 passes through reservoir 56 into the boiler of unit 51, and is redistilled. This system is utilized for a very definite purpose. The boiling temperature of the liquid in a barometric type still is so low that it does not kill all the organic life existing in the raw water, and there may be a tendency during the continuous operation of the still for bacteria to be transferred across from the boiler into the distilled water reservoir. The presence of salts and other foreign matter in the raw water coming into the boiler 50 from reservoir 52 up barometric column 53 may be so great as to nullify or chemically destroy any sterilizing material put into the raw water. Therefore, it is not always possible to prevent bacteria from entering into the boiler 50, and the distillate in reservoir 54 which travels down barometric column 55 and into reservoir 56 may not be bacterially pure, even though it will be chemically pure from the distillation process. Therefore, a germicide such as, for example, potassium permanganate, can be added to the liquid in reservoir 56 in sufficient quantity to destroy all bacteria and other organic matter present in the distilled water.

Unit 51 comprised of boiler 57, condenser 58, and reservoir 59, distills this permanganate solution and removes the water from it by distillation. The redistilled water 60 in reservoir 59 travels down barometric column 61 into reservoir 62, now both chemically and bacterially pure. The boilers in units 50 and 51 are energized by solar absorbers 63 and 64, respectively, in a manner similar to that described in Fig. 1. Unit 50 in which the raw water is originally heated has a trap 65, a barometric column 66, and a heavy salt reservoir 67, which operates in the same manner as that described in Fig. 1.

In the system as described, the distillate from unit 50 must pass through reservoir 56 before entering unit 51 to be redistilled. In this manner the potassium permanganate added to reservoir 56 will always remain in the system to kill all bacteria carried over by the distillate from unit 50. However, it may be necessary to bypass this reservoir upon occasion by connecting reservoir 51 directly with boiler 57 as by a pipe 70. This pipe may be provided with a valve 71 to shut off the fluid passage through pipe 70 as described. As an aid to operating the unit, the boiler 50 has a transparent fluid level indicator 72 located on it, and reservoir 54 has on the distillate side a fluid level indicator 73. Also unit 51 is provided with a fluid level indicator 74 provided for boiler 57, and a fluid level indicator 75 located on distillate reservoir 59.

Figure 3:
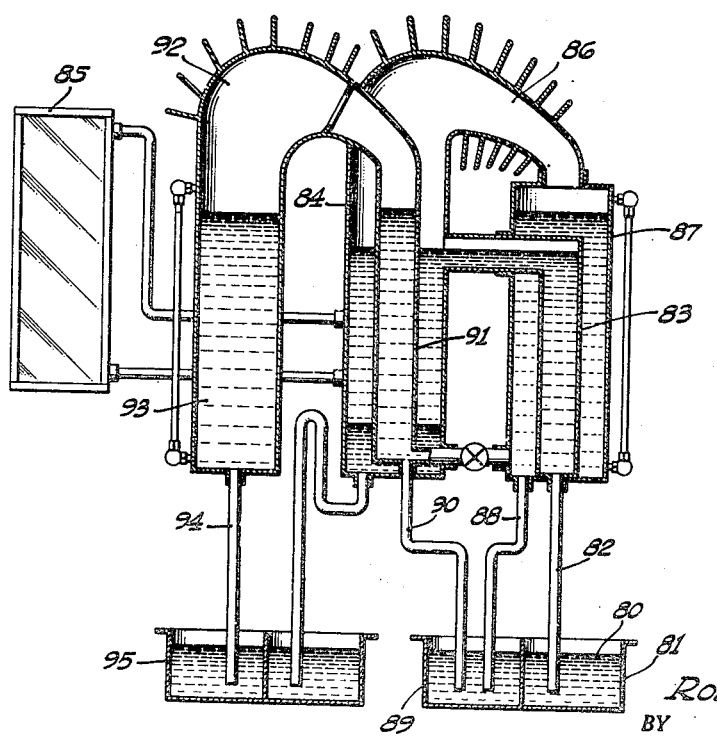
Fig. 3 is a diagrammatic layout of a redistillation still having the first distillate redistilled in a boiler located within the boiler of the orignal mother liquor.

Fig. 3 is an alternate and more compact form of the redistillation apparatus described in Fig. 2, in which the hot water in the first boiler heats and distills the water being redistilled in the second boiler. The raw water 80 in water reservoir 81 passes up barometric column 82 through heater 83 and into boiler 84, where it circulates and is heated by solar heater 85. Vapor from this boiled liquid passes into condenser 86 and into distillate reservoir 87, from whence it passes down through barometric column 88 into reservoir 89. From reservoir 89 the distillate may pass upward through barometric column 90 into a boiler 91 which is located within the original boiler 84 and is heated by the hot, undistilled liquid surrounding it which has been circulated through solar heater 85. However, the salt content of the distilled liquid inside boiler 91 being less than that in the raw stock liquid 84, it will have a lower boiling point, and therefore will compensate for any heat transmission loss between the two liquids. As in Fig. 2, the first distillate in reservoir 89 may be treated with a germicide, for example, potassium permanganate, to render it bacterially pure. The first distillate is redistilled from boiler 91 into condenser 92, and collects in reservoir 93 from which it passes down barometric column 94 into the final reservoir 95, both chemically and bacterially pure. In this apparatus, as in Figs. 1 and 2, fluid level indicators, some of which are shown, may be used to indicate the fluid levels in all boilers and reservoirs.

Figure 4:
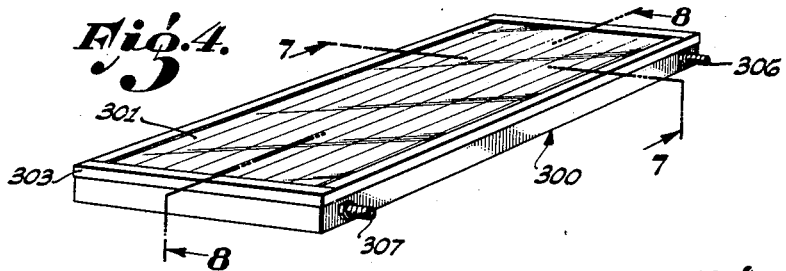
Fig. 4 is a perspective view of a preferred form of solar absorber.
Figure 5:
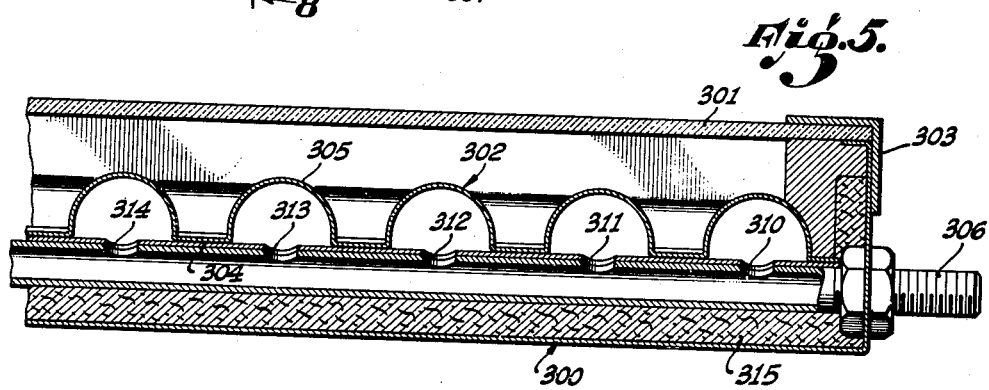
Fig. 5 is a vertical section taken approximately on line 7—7 of Fig. 4.
Figure 6:
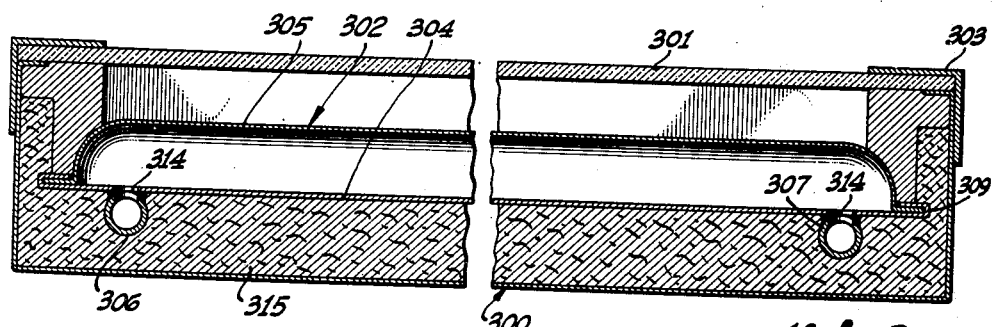
Fig. 6 is a longitudinal medial section on Fig. 4 taken approximately along the line 8—8.
Figure 7:
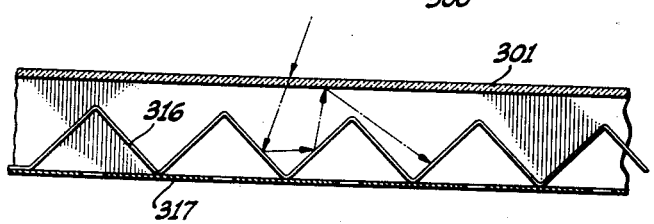
Fig. 7 is an alternate form of absorber element.

By reference to Figs. 4, 5 and 6, the construction of a plate-type solar absorber is shown. The unit consists of a shell 300, having a transparent cover 301 through which solar radiation may penetrate with minimum loss, and a fluid carrying unit 302 through which the fluid may circulate in this solar heat absorber. Transparent cover 301 is held in position on shell 300 by a suitable frame 303. The fluid carrying unit 302 is comprised essentially of a front plate 304 and a back plate 305 which two plates are sealed together at their edges against leakage of liquid from the inside, or from the leakage of air into the unit. In the form of fluid-carrying means 302 as shown in Figs. 5, 6 and 7, the back plate 304 in Figs. 5 and 6 and back plate 317 in Fig. 7 are substantially flat. The front plate 305 is exposed to direct solar radiation which penetrates through transparent cover 301, and this plate is of irregular contour as shown in Figs. 5, 6, 7 and 8. The corrugations of front plate 305 serve primarily to conduct the fluid in separate channels through the unit, but they also serve several other purposes. Inasmuch as the fluid within this heater may be under vacuum, the curved structure of the upper plate 305 serves to distribute air pressure load of fifteen pounds per square inch on the outside of the plate which tends to collapse the unit. The curved upper surface of plate 305 also serves to minimize the loss of radiant energy entering the absorber unit through transparent cover 301 by rereflecting it within the unit against the absorbing surface. The most efficient type of absorber is one in which loss of energy by re-reflection from the absorbing surface is the least. The fluid channels afforded by the corrugation also insure movement of the fluid as a whole, and minimize the tendency of formation of a single current of fluid through the unit which might otherwise leave large areas standing relatively motionless. Thus the entire body of fluid moves uniformly through the absorbing unit and uniformly removes heat from the unit in the heated water or other fluid emerging from it.

The absorber unit comprised of plates 304 and 305 has two pipes 306 and 307, respectively attached to the back plate of 304 at the upper end 308 and the lower end 309 thereof. A series of holes 310, 311, 312, 313, 314, etc., are drilled through plate 304 into the channels afforded by corrugations afforded by front plate 305. Corresponding holes are drilled in pipes 306 and 307, and the pipes are then welded or in some other manner attached in place on plate 304 so that the holes in each pipe are in alignment with those on plate 304. Thus the fluid to be heated may enter through pipe 307, travel through holes 310, 311, 312, etc., into the corrugated channels of front plate 305, absorb solar energy in the form of heat, and finally pass out of the heater unit through pipe 308 at the top. It should be noted that upper plate 305 has its full surface exposed to direct solar radiation, and therefore will tend to become uniformly heated throughout. However, all energy absorbed by upper plate 305 will be transferred to the fluid passing through the unit (with exception of the usual conduction and radiation losses).

Absorber unit 302 is surrounded on the sides, back, and end in shell 300 by suitable heat insulating material 315. This merely serves to increase the efficiency of the unit as a whole and minimizes the escape of heat by radiation or conduction through the walls of shell 300.

Figure 8:
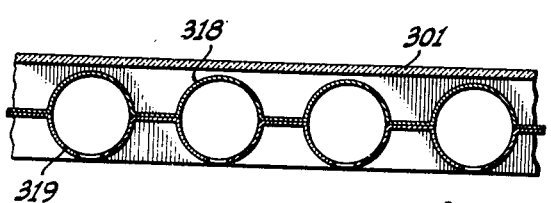
Fig. 8 is another form of absorber element.

Figs. 7 and 8 show sectional views of an alternate construction of the absorber unit 302. In Fig. 7 the upper plate is shown as a corrugated member 316 having a substantially triangular cross-section resting against the flat back plate 317. Variations of this type of construction may be used to minimize the direct re-reflection of absorbed energy from the absorber surface plate 316. In Fig. 8 front plate 318 and back plate 319 have complementally hemispherical corrugations which, when the plates are laid together, form fluid channels having substantially circular cross-sections. The external air pressure on such a construction would have less lapse the unit than those constructions shown in Figs. 5, 6 and 7 wherein the back plate is substantially flat. However, in all three types of absorbers shown in Figs. 5, 6, 7 and 8, the absorber unit consists essentially of a front plate which is more or less irregular in shape, and a back plate which may or may not be irregular in shape.

I have shown and described as my invention various forms of single and multiple stills, and one form of solar heater which may be used as a source of heat to operate these stills. In the application of the various embodiments of my invention to the specific problem of water purification, various other modifications thereof will suggest themselves to those skilled in the art, but I have in the foregoing specification described in detail apparatus of great simplicity, novelty and utility and which has features adaptable to all the variables of its commercial application. However, it is to be understood that the forms herein disclosed are merely illustrative of the novel features embodied in my invention, and that the same it not to be limited thereto, but is to be afforded the full scope of the appended claims.

I claim:

1. In apparatus for distilling water under reduced pressure: a water boiler; a condenser to condense water evaporated from said boiler; means for maintaining a predetermined pressure within said boiler below that of the outside air; means for adding and for removing elements of the distillation process to and from the still during its continuous operation within the established operating pressure range said means including a boiler flushing means comprising an overflow reservoir, a barometric column between said reservoir and said boiler, and a fluid trap in said barometric column wherein a certain amount of heavy salt water may collect prior to periodic flushing; and a solar heat absorbing means connected to said boiler by a plurality of tubular members through which water circulates by convection from and to said boiler.

2. An apparatus for continuously distilling water under reduced pressure comprising: a reduced pressure boiler; a solar heat absorber through which water from said boiler may be circulated and heated; a condenser associated with said boiler to condense water evaporated from said boiler; a source of inlet water; a barometric column of water between said inlet source and said boiler whereby the water level in said boiler is maintained by air pressure upon the surface of said inlet water; a distilled water reservoir; a second barometric column of water between said distilled water reservoir and said condenser whereby the water level in said condenser is maintained by air pressure upon the surface of said distilled water reservoir; and a boiler flushing means comprising an overflow reservoir; a barometric column between said overflow reservoir and the lower portion of said boiler; a fluid trap in said barometric column wherein a certain amount of heavy salt water may collect prior to periodic flushing, the air pressure on the surface of said overflow reservoir serving to maintain a column of fluid in said flushing barometric column.

3. In apparatus for distilling water, the combination of: a boiler; a condenser connected to said boiler and adapted to condense the vapor produced therein; a solar heater connected to said boiler by a plurality of tubular members through which water circulates by convection from and to said boiler; and means for maintaining a sub-atmospheric pressure in said boiler and condenser whereby said water will be continuously distilled at reduced temperatures, said pressure maintaining means comprising a barometric column for inlet water connected to the upper portion of said boiler; a barometric column for distillate connected to said condenser and a barometer column connected to the lower portion of said boiler for removing residual salts, whereby components of the distillation process are automatically and proportionally added to and removed from said apparatus while the same is operating.

4. An apparatus for continuously distilling water under reduced pressure comprising: a reduced pressure boiler; a solar heat absorber through which water from said boiler may be circulated and heated; a condenser associated with said boiler to condense water evaporated from said boiler; a source of inlet water; a barometric column of water between said inlet source and said boiler whereby the water level in said boiler is maintained by air pressure upon the surface of said inlet water; a distilled water reservoir; a second barometric column of water between said distilled water reservoir and said condenser whereby the water level in said condenser is maintained by air pressure upon the surface of said distilled water reservoir; and a boiler flushing means comprising an overflow reservoir; a barometric column between said overflow reservoir and the lower portion of said boiler; means in said barometric column wherein a certain amount of heavy salt water may collect prior to periodic flushing, the air pressure on the surface of said overflow reservoir serving to maintain a column of fluid in said flushing barometric column.

5. In apparatus for distilling water, the combination of: a boiler; a condenser connected to said boiler and adapted to condense the vapor produced therein; a solar heater connected to said boiler by a plurality of tubular members through which water circulates by convection from and to said boiler; and means for maintaining a sub-atmospheric pressure in said boiler and condenser whereby said water will be continuously distilled at reduced temperatures, said pressure maintaining means including an overflow reservoir, a barometric column between said reservoir and the lower portion of said boiler and means in said column for collecting a certain amount of heavy salt water prior to periodic flushing, the air pressure on the liquid in said reservoir serving to maintain liquid in said column.

6. In apparatus for continuously distilling water, the combination of: a low pressure boiler; a condenser connected to said boiler and adapted to condense the water vapor produced therein; a solar heater connected to said boiler by means permitting circulation of water through said boiler and heater by convection; and means for maintaining a sub-atmospheric pressure in said boiler and automatically and proportionally adding and removing components of the distillation process which includes a barometric column connected to the upper portion of said boiler adapted to supply feed water thereto as required, a barometric column connected to said condenser adapted to collect discharge distilled water from said condenser, and a barometric column connected to the lower portion of said boiler adapted to remove the heavy residue of distillation from said boiler.

7. In apparatus for continuously distilling water, the combination of: a low pressure boiler; a condenser connected to said boiler and adapted to condense the water vapor produced therein; a solar heater connected to said boiler by means permitting circulation of water through said boiler and heater by convection; means for maintaining a sub-atmospheric pressure in said boiler and automatically and proportionally adding and removing components of the distillation process which includes a barometric column connected to the upper portion of said boiler adapted to supply feed water thereto as required, a barometric column connected to said condenser adapted to collect discharge distilled water from said condenser, and a barometric column connected to the lower portion of said boiler adapted to remove the heavy residue of distillation from said boiler; and means in said residue removal barometric column restricting upward flow of fluid therein.

ROBERT E. SNYDER.

REFERENCES CITED

The following references are of record in the file of this patent:

UNITED STATES PATENTS

| Number | Name | Date |
| --- | --- | --- |
| 21,693 | Normandy | Oct. 5, 1858 |
| 419,215 | Pamphlett | Jan. 14, 1890 |
| 798,964 | Hodges | Sept. 5, 1905 |
| 891,264 | Knipp | June 23, 1908 |
| 1,141,265 | Rashig | June 1, 1915 |
| 2,064,345 | Hodgson | Dec. 15, 1936 |
| 2,133,649 | Abbott | Oct. 18, 1938 |
| 2,141,330 | Abbott | Dec. 27, 1938 |
| 2,301,835 | White | Nov. 10, 1942 |
| 2,342,062 | Schenk | Feb. 15, 1944 |
| 2,392,861 | Pernert | Jan. 15, 1946 |
| 2,400,947 | Pernert | May 28, 1946 |

FOREIGN PATENTS

| Number | Country | Date |
| --- | --- | --- |
| 160,907 | Germany | June 9, 1905 |